(12) United States Patent
Sadeck et al.

(10) Patent No.: US 6,328,262 B1
(45) Date of Patent: Dec. 11, 2001

(54) METHOD FOR FORMING A PARACHUTE AND A PARACHUTE FORMED THEREBY

(75) Inventors: James Sadeck, East Freetown, MA (US); James R. Beck, Missoula, MT (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/710,735

(22) Filed: Nov. 8, 2000

(51) Int. Cl.[7] .................................................. B64D 17/00
(52) U.S. Cl. ............................................ 244/142; 244/145
(58) Field of Search ..................................... 244/142, 145, 244/152, 138 A

(56) References Cited

U.S. PATENT DOCUMENTS

| | | | |
|---|---|---|---|
| 3,507,467 | * 4/1970 | Sepp | 244/145 |
| 3,741,506 | 6/1973 | Kohnke | 244/145 |
| 3,856,240 | 12/1974 | Forbis | 244/142 |
| 4,529,153 | 7/1985 | Conn | 244/126 |
| 4,637,330 | 1/1987 | Shewmon | 112/417 |
| 4,684,082 | 8/1987 | Gargano | 244/142 |
| 4,813,636 | * 3/1989 | Lindgren | 244/152 |
| 4,993,667 | * 2/1991 | Uotila | 244/142 |
| 5,123,616 | * 6/1992 | Buckley et al. | 244/145 |
| 6,270,128 | * 8/2001 | Coe | 244/152 |

* cited by examiner

Primary Examiner—J. Woodrow Eldred
(74) Attorney, Agent, or Firm—Vincent J. Ronucci

(57) ABSTRACT

A method for forming a parachute of a round configuration when deployed, and having a diameter D and a central vent of a diameter d, includes the steps of sewing together a plurality of elongated bolt widths of parachute cloth, the parachute cloth bolt widths being sewn together along lengthwise edges thereof to provide a sheet having seams interconnecting pairs of the bolt widths of cloth, the sheet having a width of about ½ D, less ½ d, cutting triangular pieces from the sheet, cutting opposite side edges of the triangular pieces to a length such that each side edge length is substantially equal to ½ D, cutting the triangular pieces from outboard edge ends to provide arc-shaped outboard edges, and sewing together the triangular pieces along the side edges thereof to produce main seams and to provide a round parachute canopy.

7 Claims, 3 Drawing Sheets

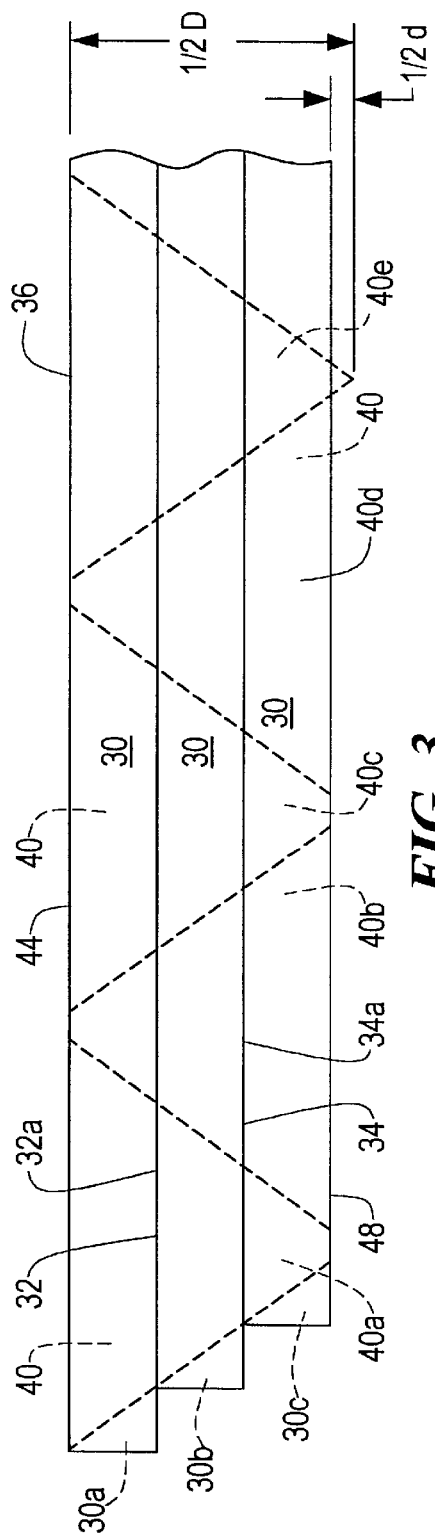
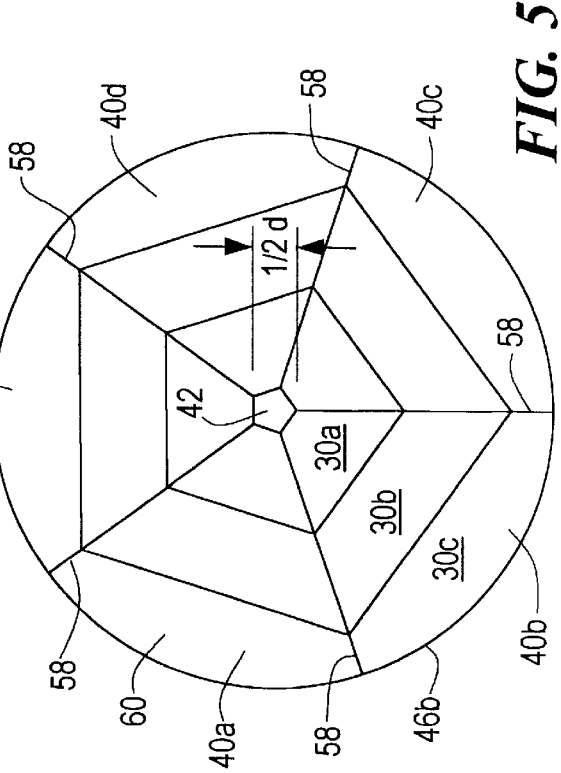
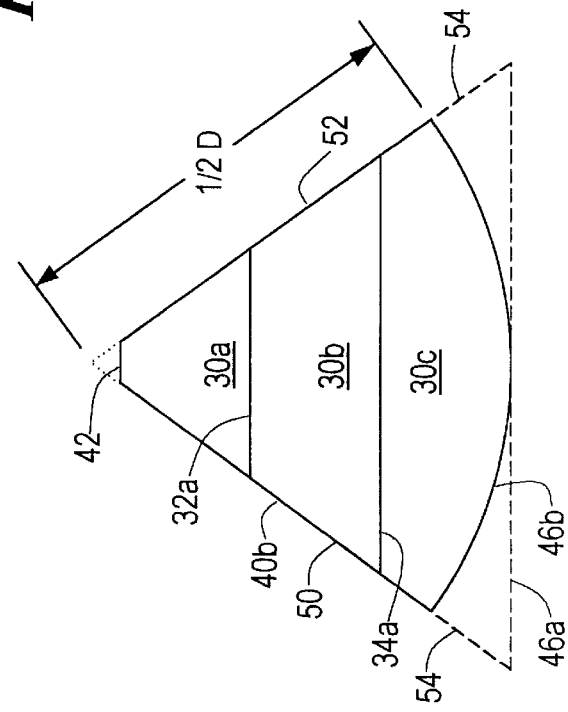
FIG. 3
FIG. 5
FIG. 4

METHOD FOR FORMING A PARACHUTE AND A PARACHUTE FORMED THEREBY

STATEMENT OF GOVERNMENT INTEREST

The invention described herein may be manufactured and used by the U.S. Government for governmental purposes without the payment of any royalty thereon.

BACKGROUND OF THE INVENTION

1. Field of the Invention

This invention relates to the fabrication of parachutes and is directed more particularly to a parachute and method for forming a parachute of round configuration when deployed.

2. Description of the Prior Art

The fabrication of parachutes having generally round canopies when deployed conventionally includes sewing together of panels 10 in diagonal fashion, as shown in FIG. 1, along panel seams 12, to form triangularly-shaped gores 14. An outboard edge 16 of each gore 14 is straight, rather than curved, but after the edges 16 are rolled to provide a skirt hem 24, and the canopy is deployed, the canopy presents to the eye of an observer a generally circular configuration. The gores 14 are sewn together along main radial seams 18 to form a canopy 20. Suspension lines 22 are secured within the main radial seams 18 and extend from a skirt hem 24 of the canopy 20 toward the apex of the canopy and across a vent area 26 at the apex of the canopy 20 and down the diametrically opposite radial seam 18 to the canopy skirt hem 24 (FIG. 2).

The above method of construction is time consuming and expensive, and contributes to a greater than desirable weight, bulk and pack volume. A parachute referred to in the U.S. Army as a G-12 cargo parachute, made in accordance with the above-described method, includes 2,050 feet of main radial seams 18 in four rows of stitching along their lengths, and 1,072 feet of panel seams 12.

There is thus a need for an improved parachute and parachute forming procedure, the latter being less time-consuming and less expensive, and the former exhibiting less weight, bulk and pack volume than is present in parachutes fabricated in accordance with the conventional procedure.

SUMMARY OF TIE INVENTION

An object of the invention is, therefore, to provide a parachute and a method for forming a parachute which provide the advantages of reduced weight, bulk, and pack volume, compared to parachutes made in accordance with current procedures.

A further object of the invention is to provide such an improved method which, in addition, requires less time and is less expensive to fabricate.

With the above and other objects in view, as will hereinafter appear, a feature of the present invention is the provision of a method for forming a parachute of a round configuration when deployed, and having a diameter D and a central vent of a diameter d, the method comprising the steps of sewing together a plurality of elongated bolt widths of parachute cloth, the parachute cloth bolt widths being sewn together along lengthwise edges thereof to provide a sheet having seams interconnecting pairs of the bolt widths of cloth, the sheet having a width of about ½ D, less ½ d, cutting triangular pieces from the sheet, cutting opposite side edges of the triangular pieces to a length such that each side edge length is substantially equal to ½ D, cutting the triangular pieces from outboard edge ends to provide arc-shaped edges, and sewing together the triangular pieces along the side edges thereof to produce main seams and to provide a round parachute canopy.

In accordance with a further feature of the invention, the above-described method includes the additional steps of sewing radial tapes to the canopy, the tapes extending from a skirt hem of the canopy, radially through a central vent of the canopy to the opposite skirt hem of the canopy, and attaching suspension lines to the canopy at the skirt hem and to the radial tapes.

In accordance with a still further feature of the invention, there is provided a parachute comprising a substantially round canopy having a central vent and a peripheral skirt hem. Tapes are sewn to the canopy and extend from a first point on the skirt hem, radially through the vent, and to a second point on the skirt hem diametrically opposed to the first point, each of the tapes having a loop at each end thereof. A hem channel is fixed to the canopy along the skirt hem. A plurality of suspension lines are provided for interconnecting the skirt hem and a load supported by the parachute in operation, the suspension lines each having a loop at an upper end thereof. A plurality of yoke lines each are provided with hoops at first and second ends thereof, each of the yoke lines extending through the loop of one of the suspension lines. A hem line extends through the hem channel, the tape loop and the yoke hoops, whereby to fix the suspension lines to the canopy.

The above and other features of the invention, including various novel details of construction and combinations of parts and method steps, will now be more particularly described with reference to the accompanying drawings and pointed out in the claims. It will be understood that the particular device and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings:

FIG. 3 is a plan view of parachute cloth bolt widths, illustrative of steps in an embodiment of the invention;

FIG. 4 is a plan view of a piece of cloth cut from the cloths of FIG. 3;

FIG. 5 is a plan view of a parachute canopy made in accordance with the invention;

DESCRIPTION OF THE PREFERRED EMBODIMENT

Figure 1:
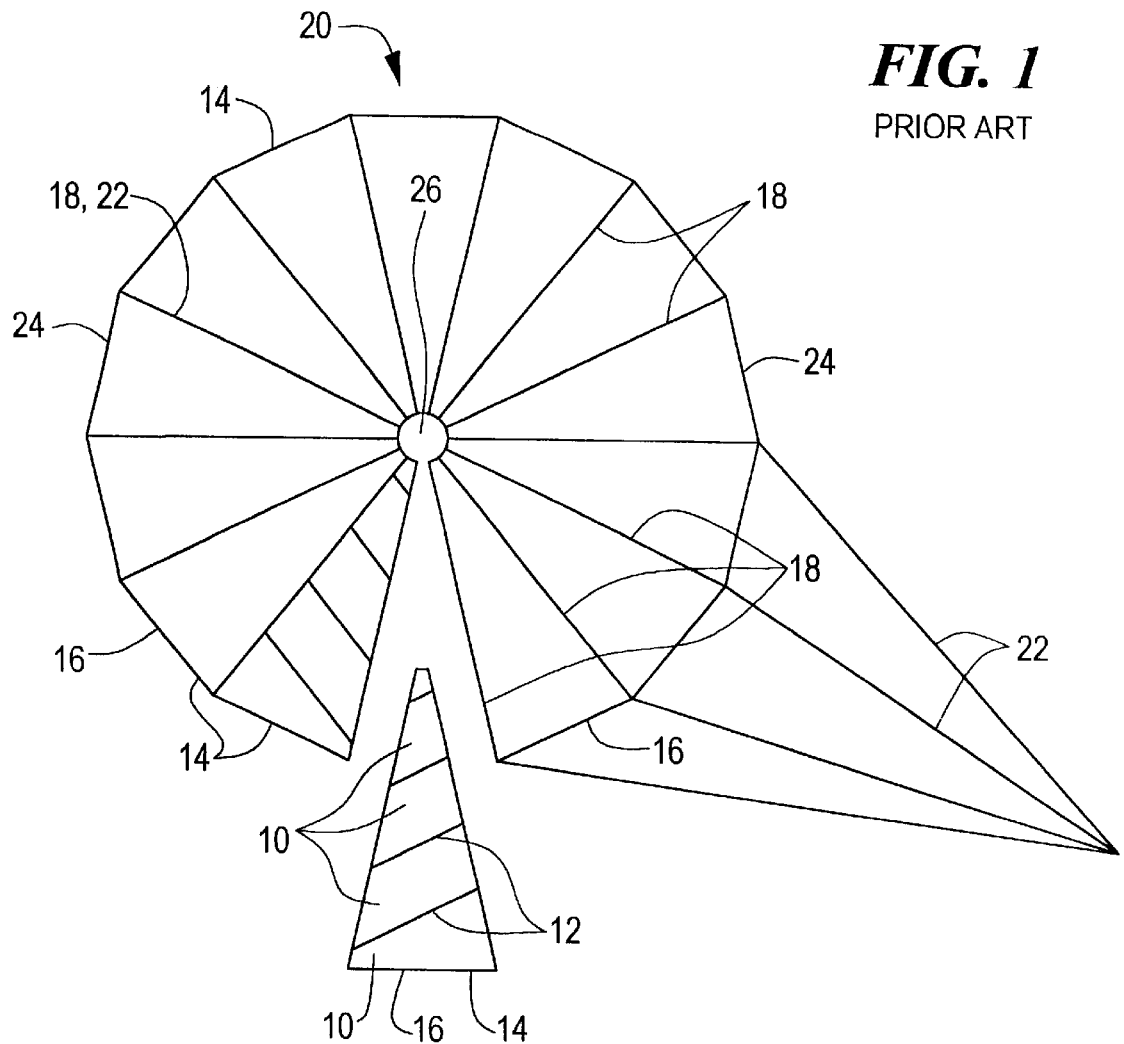
FIG. 1 is a diagrammatic generally top plan view illustrating a prior art method for forming a parachute.
Figure 2:
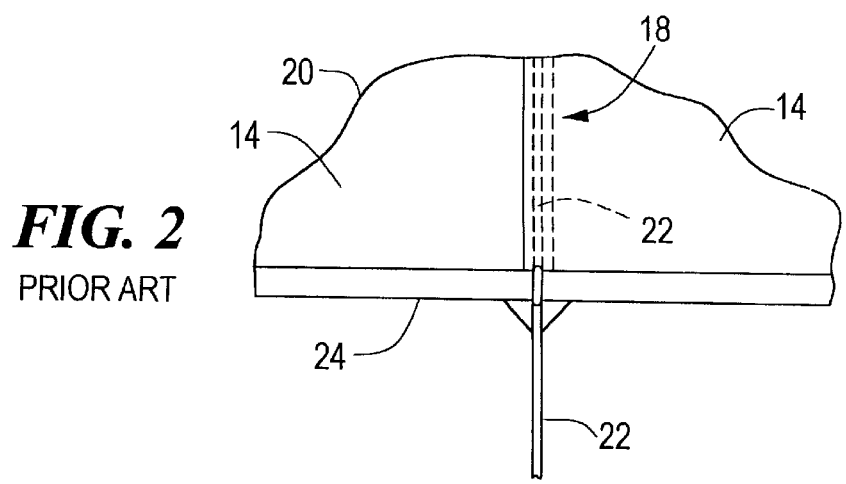
FIG. 2 is a diagrammatic side elevational view of a portion of the parachute of FIG. 1.

Referring to FIG. 3, it will be seen that a plurality of bolt widths of parachute cloth 30 are positioned edge-to-edge. A bolt width is a selected one of 40 inches, 60 inches, 72 inches, and 84 inches, depending upon the size of the parachute to be fabricated. As a general rule, bolt widths of parachute cloth 30 are used such that their combined widths are approximately equal to one-half the diameter (½ D) of the desired parachute canopy. The bolt widths of parachute cloth 30 are sewn together along lengthwise edges thereof 32, 34 to provide a sheet 36 panel seams 32a, 34a, each interconnecting a pair of the bolt widths of parachute cloth 30a, 30b and 30b, 30c.

A plurality, typically four or five, triangular pieces 40, including pieces 40a–40e are then cut from the sheet 36, the pieces 40 being shown in phantom in FIG. 3. In FIG. 4, one of the triangular pieces 40b is shown in detail, the remaining triangular pieces 40a, 40c, 40d, and 40e being substantially the same. In FIG. 4, it will be seen that the triangular piece 40b includes a first edge 42 formed by one side 44 of the sheet 36, and a second edge 46a formed by a second side 48 of the sheet. The triangular piece 40b further includes side edges 50, 52.

The opposite side edges 50, 52 of the triangular piece 40b are cut near their outboard ends 54 such that the lengths of the side edges 50, 52 are reduced to about ½ D, and the second edge 46a of the piece 40b is cut along an arc to provide the piece with an arc-shaped outboard edge 46b.

The triangular pieces 40 are then sewn together along their side edges 50, 52 to produce main seams 58 (FIG. 5) and to provide a round parachute canopy 60.

Figure 6:
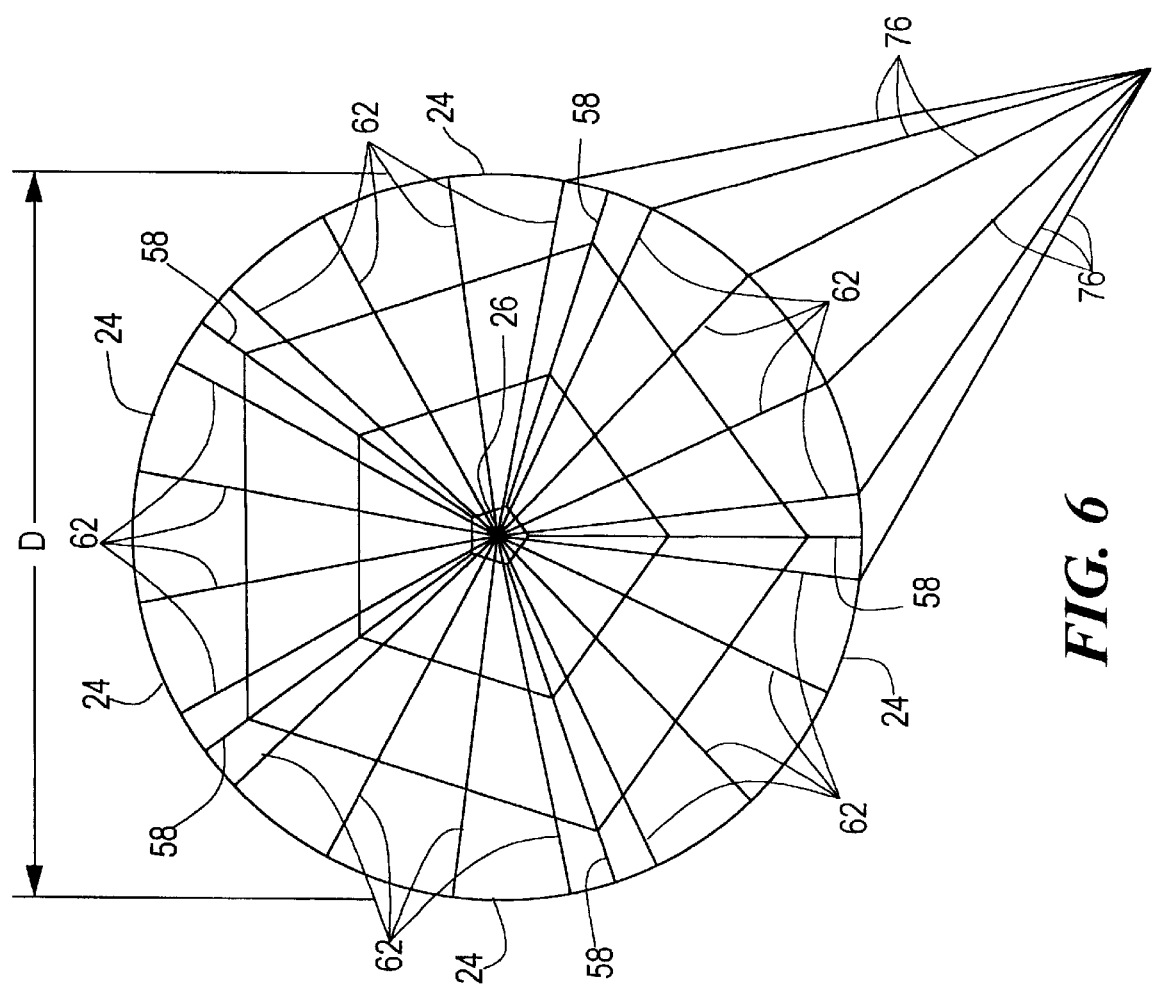
FIG. 6 is similar to FIG. 5, but illustrative of an additional step in the inventive method.

Referring to FIG. 6, it will be seen that radial tapes 62 are sewn to the canopy 60.

Referring to FIG. 6, it will be seen that radial tapes 62 are sewn to the canopy 60. The tapes 62 extend from a first end on the skirt hem 24, radially across the vent 26 and to a second end on the skirt hem 24 diametrically opposite the first end. The tapes 62 are high tensile strength strips which distribute the payload forces over the parachute canopy.

Figure 7:
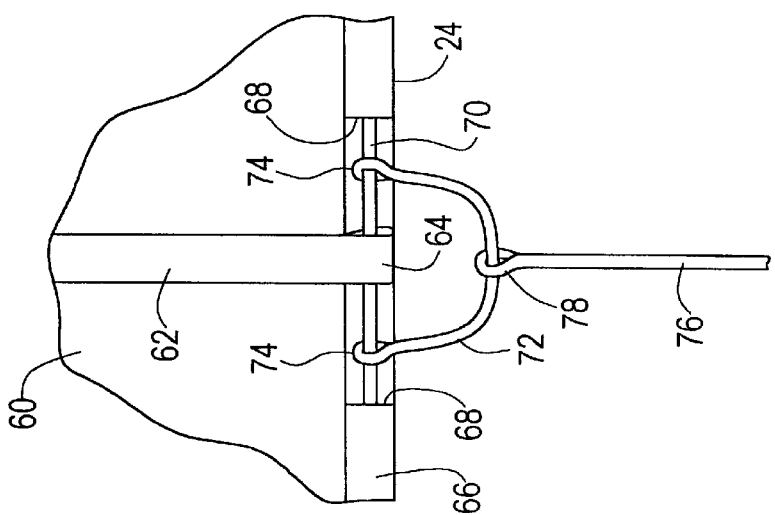
FIG. 7 is similar to FIG. 2, but illustrative of the inventive parachute and method.

As shown in FIG. 7, the ends of the tapes 62 are provided with a loop 64, and the skirt hem 24 is provided with a canopy hem channel 66. The hem channel is provided with gaps 68 in the vicinity of the loops 64. A hem line 70 is extended through the hem channel 66 and the tape loop 64. There is further provided a yoke line 72 having a hoop 74 at each end thereof. Suspension lines 76 are provided, one for each of the tapes 62. Each of the suspension lines 76 is provided with a loop 78 at an end thereof.

In fabrication of the parachute, a yoke line 72 is extended through the loop 78 of a suspension line 76, such that the suspension line can hang from the yoke line, as shown in FIG. 7. The hem line 70 is then extended through the canopy hem channel 66 and through the tape loops 64 and yoke line hoops 74. The hem line 70 is then secured in place.

The above-described method for attachment of suspension lines 76 to round parachute canopies splits the load of each suspension line 76 between the two hoops 74 of the yoke line 72, and on both sides of the hem line 70 relative to the radial tape 62, thereby distributing the load on both sides of the radial tape 62 and into the radial tape and skirt. A fullness is created at the skirt hem during the inflation phase of operation of the parachute because of the constricting effect exerted at each suspension line attachment point on the skirt hem. Such reduces stress in the canopy at the attachment areas and reduces the circumference of the canopy, producing a reefing effect which slows opening/inflation of the parachute, lowering the peak opening force on the parachute.

A parachute made in accordance with the above-described method and having a diameter of 62 feet, compared with a G-12 parachute having a diameter of 64 feet, carries the same payload at the same rate of descent. However, the parachute described herein weighs less, 80 lbs. as opposed to 128 lbs., has fewer gores, 40 rather than 64, fewer suspension lines, 40 rather than 64, and 716 feet of seams as compared to 3,122 feet of seams in the G-12 parachute. Further, the packed volume of the new parachute is 30% less than that of the G-12 parachute.

There has thus been provided an improved parachute and method for forming a parachute, the new parachute and method providing the advantages of less weight and pack volume. Further, the new parachute requires less time and is less expensive to fabricate.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. A method for forming a parachute of a round configuration when deployed, and having a diameter D and a central vent of a diameter d, the method comprising the steps of:

sewing together a plurality of elongated bolt widths of parachute cloth, said parachute cloth bolt widths being sewn together along lengthwise edges thereof to provide a sheet having seams interconnecting pairs of the bolt widths of cloth, the sheet having a width of about ½ D, less ½ d;

cutting triangular pieces from the sheet;

cutting opposite side edges of the triangular pieces to a length such that each side edge length is substantially equal to ½ D;

cutting the triangular pieces from outboard edge ends to provide arc-shaped outboard edges; and sewing together the triangular pieces along the side edges thereof to produce main seams and to provide a round parachute canopy.

2. The method in accordance with claim 1 comprising the further steps of:

sewing radial tapes to the canopy, the tapes extending from a skirt hem of the canopy, radially through the central vent of the canopy to an opposite portion of the skirt hem of the canopy; and attaching suspension lines to the canopy at the skirt hem and to the radial tapes.

3. The method in accordance with claim 1 comprising the further steps of:

sewing radial tapes to the canopy, the tapes extending from a first end thereof proximate a first point on a skirt hem of the canopy, radially through the central vent to a second end thereof proximate a second point on the skirt hem of the canopy diametrically opposite from the first point, the tape ends being provided with a loop;

sewing a channel at the canopy hem, and providing gaps in the channel on either side of each of the radial tapes;

providing a plurality of yoke lines, each having at each end thereof an attachment hoop;

providing a plurality of suspension lines, each having a loop at a first end thereof;

extending one of the yoke lines through each of the suspension line loops, such that each suspension line can hang from one of the yoke lines; and extending a hem line through the canopy hem channel and through the radial tape loops and through the yoke line hoops and securing the hem line in place.

4. The method in accordance with claim 1 wherein upon cutting said triangular pieces from the sheet, each triangular piece includes a first a edge formed by one side of the sheet, and a second edge formed by a second side of the sheet.

5. A parachute comprising:
- a substantially round canopy having a central vent and a peripheral skirt hem;
- tapes sewn to said canopy and extending from a first point on said skirt hem, radially through the vent, and to a second point on said skirt hem diametrically opposed to the first point, each of said tapes having a loop at each end thereof;
- a hem channel fixed to the canopy along the skirt hem;
- a plurality of suspension lines for interconnecting the skirt hem and a load supported by the parachute in operation, said suspension lines each having a loop at an upper end thereof;
- a plurality of yoke lines each having hoops at first and second ends thereof, each said yoke line extending through the loop of one of said suspension lines; and
- a hem line extending through the hem channel, the tape loop, and the yoke hoops;
- whereby to fix said suspension lines to said canopy.

6. The parachute in accordance with claim 5 wherein said hem channel is provided with gaps therein, each in the vicinity of one of the tape loops.

7. The parachute in accordance with claim 6 wherein the hoops of one of said yoke lines is disposed in one of the gaps, one on each side of the one of the tape loops.

* * * * *